United States Patent [19]  
Smith et al.

[11] 3,871,849  
[45] Mar. 18, 1975

[54] DISPOSABLE CARBON FILTER
[75] Inventors: Tom R. Smith; Richard D. Rivers, both of Louisville, Ky.
[73] Assignee: American Air Filter Company, Inc., Louisville, Ky.
[22] Filed: Apr. 5, 1973
[21] Appl. No.: 348,172

[52] U.S. Cl. ............ 55/484, 55/489, 55/491, 55/508, 55/515, 55/DIG. 31
[51] Int. Cl. ............................. B01d 27/08
[58] Field of Search ............ 55/484, 489, 491, 494, 55/508, 515, DIG. 31, 387, 316

[56] References Cited  
UNITED STATES PATENTS

| | | | |
|---|---|---|---|
| 1,954,924 | 4/1934 | Engberg et al. | 55/316 |
| 2,871,977 | 2/1959 | Kling | 55/491 X |
| 2,988,168 | 6/1961 | Wittemeier et al. | 55/DIG. 31 X |
| 3,483,677 | 12/1969 | Pinto | 55/316 |
| 3,727,384 | 4/1973 | Feldman | 55/316 X |
| 3,727,769 | 4/1973 | Scholl | 55/515 X |

FOREIGN PATENTS OR APPLICATIONS  
1,407,875  11/1968  Germany ............. 55/491

Primary Examiner—Frank W. Lutter  
Assistant Examiner—William Cuchlinski, Jr.

[57] ABSTRACT

The invention provides a disposable carbon filter comprising at least one six-sided paperboard carton including a pair of opposed parallel panels having cutaway sections, defining opposed flow-through apertures therein, for the ingress of dirty air to be treated and the egress of clean air after treatment; and, a fluid pervious scrim material disposed within the paperboard carton across the flow-through apertures to compressively contain activated carbon particles.

6 Claims, 9 Drawing Figures

PATENTED MAR 18 1975 3,871,849
SHEET 1 OF 4
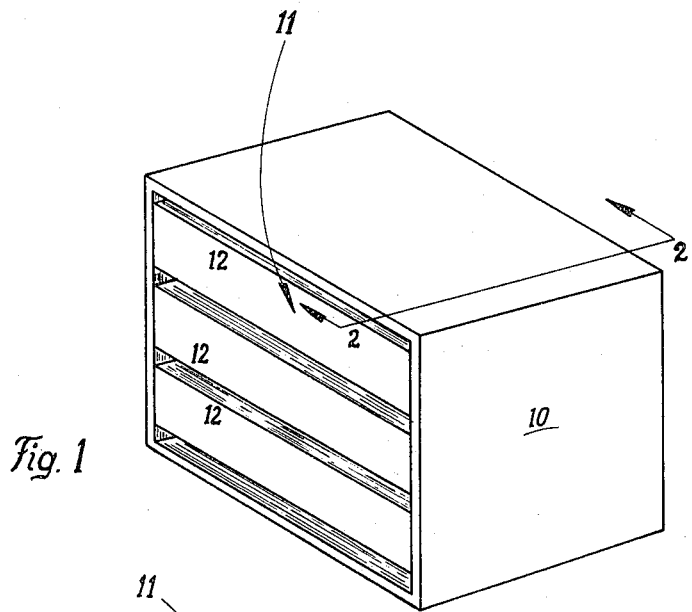
Fig. 1
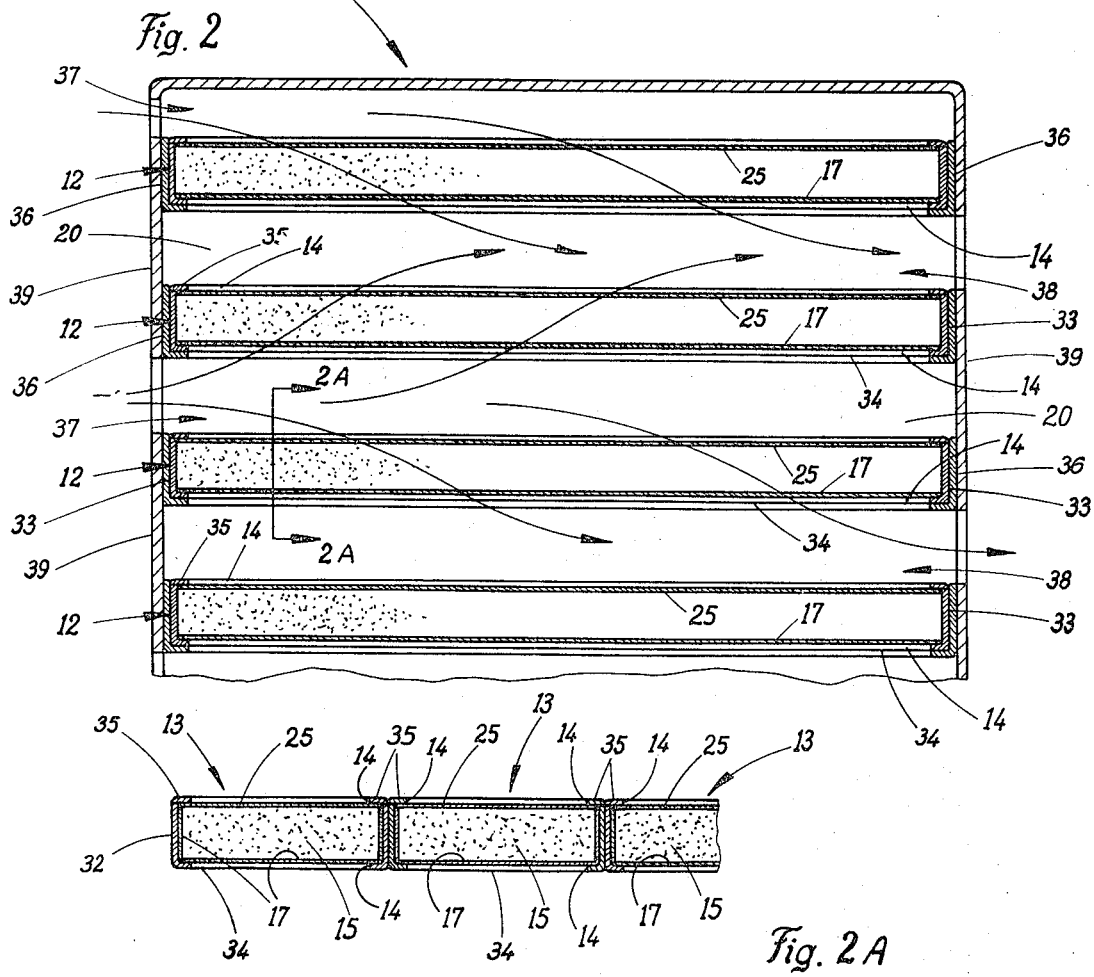
Fig. 2
Fig. 2A

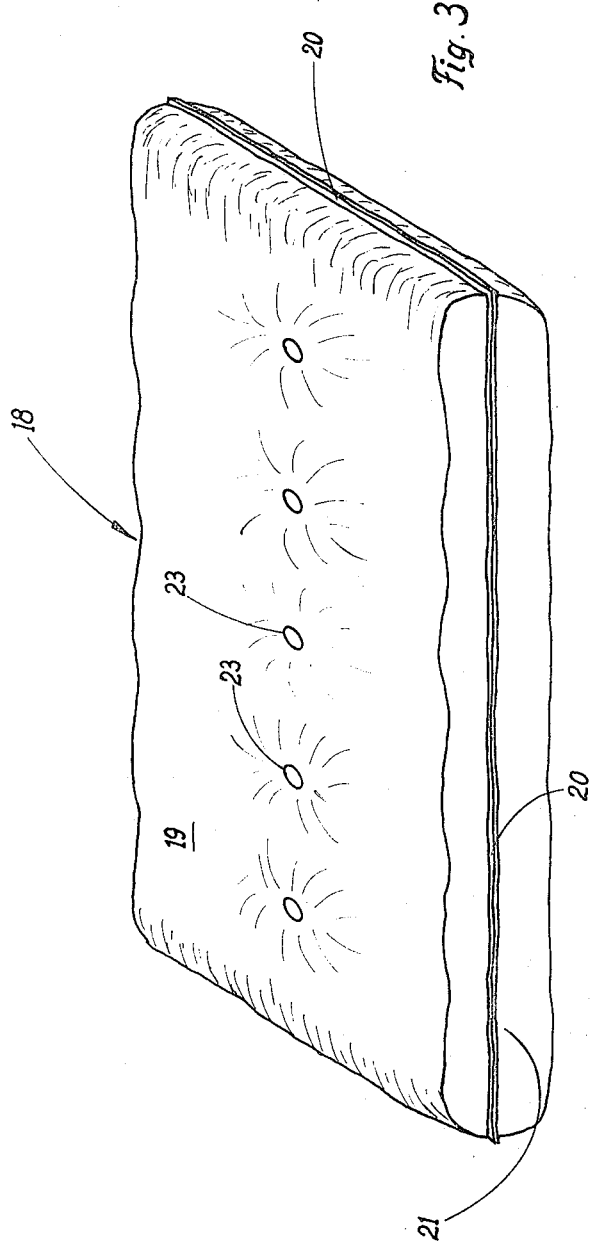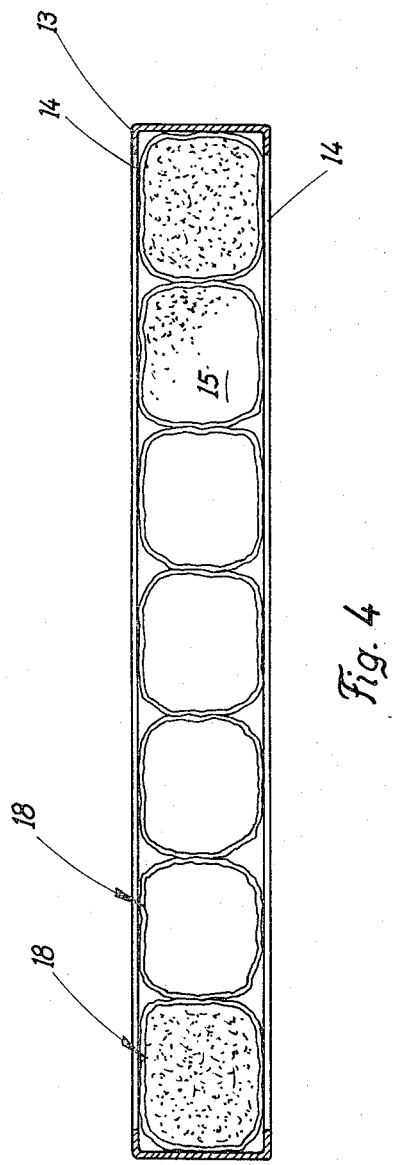

DISPOSABLE CARBON FILTER

BACKGROUND OF THE INVENTION

It is known in gas filtration technology to use carbon to eliminate unpleasant or noxious odors from gases. Activated charcoal is frequently used, it being contained in a suitable casing, which generally takes the form of a flat box-shaped tray, with a plurality of such trays being arranged in a flow-through housing. The gas to be filtered is passed through the trays which generally extend transversely in relation to the gas flow through the housing.

One of the problems with such an arrangement is, however, that the activated charcoal in the trays tends to settle during the operation of the filter, thus opening leakage paths therethrough. In an attempt to solve the problem the activated charcoal is frequently vibrated, while being fed into the tray, to compact it and minimize subsequent settling, thereby preventing the formation of large spaces which would allow gas to pass through the filter without contacting the charcoal. Such vibration also prevents further settling during shipment and subsequent operation, but it cannot prevent settling completely, in as much as, the active charcoal granules abrade and diminish in size, thereby becoming more closely packed.

To prevent the deleterious effects of settling of the filter material, the trays are commonly stacked within the housing so that the active charcoal contained therein can settle only parallel to the direction of flow of the incoming dirty gas; thus, settling merely reduces the bed thickness rather than opening leakage paths. However, such an arrangement requires that the gas to be purified be directed through the trays at right angles to the direction at which it enters the housing, thereby necessitating a change of direction of the gas within the housing. To accomplish such a change of direction, it is generally required that the alternate ends of successive carbon filter trays be connected to fluid impervious plate means to define gas receiving and gas expelling chambers. Such chambers are arranged parallel to the direction of gas flow through the housing so that the gas flowing into the gas receiving chambers flows into one end thereof, changes direction by 90° degrees to pass through a filter tray, comprising either the top or bottom surface of the chamber, and finally changes direction back by 90° to pass out of the housing through an expelling chamber. The receiving and expelling chambers are formed by connecting the ends of each stacked tray to fluid impervious plate means. The plate means extend from one end of each tray to one end of the tray above, and from the other end of the tray to the tray below. The plate means generally comprise a flat sheet of impervious material vertically disposed and riveted or welded to the respective tray ends. Such as arrangement is expensive and cumbersome to fabricate and install. In addition to the aforementioned disadvantages, replacement of the active charcoal in such filters is difficult and time consuming requiring removal of the trays from the housing, which may require unfastening weld joints or rivets or damaging elastomeric seals around the tray perimeters. Also, the metal trays containing the active charcoal frequently must be discarded because they are not reusable. In contradistinction, the invention of this disclosure provides a straightforward, inexpensive, readily constructed and easily maintained disposable filter assembly for removing unpleasant or noxious odorous substances from gases using granular active charcoal.

SUMMARY OF THE INVENTION

The invention provides a disposable carbon filter comprised of at least one paperboard carton containing granular activated carbon compressively contained by a porous scrim material. More specifically, the invention provides a carbon filter comprising: at least one six-sided carton including a pair of opposed panels having cutaway sections defining flow-through apertures therein; sidewalls connecting said panels; end portions forming closed ends on said carton; and, a fluid pervious scrim material disposed within said carton across said flow-through apertures compressively containing activated granular carbon particles to form a filter bed resistant to the adverse effects of vibration and carbon particle attrition. The filter assembly of this invention has been found to be particularly useful when the fluid pervious scrim is in the form of fabric bags compressively containing granular carbon particles which bags are then placed in the carton side-by-side to form a carbon filter bed. Such filter bags allow almost no settling or movement of the contained granular carbon filter material.

DESCRIPTION OF THE DRAWINGS

FIG. 1 is an isometric view of a filter housing containing a filter tray assembly.

FIG. 2 is an enlarged elevational cross-sectional view of a filter tray assembly of FIG. 1.

FIG. 2A is an elevated cross-sectional view taken along line 2A of FIG. 2 showing a filter tray made up of individual paperboard cartons.

FIG. 3 shows a fabric bag structure containing granular carbon particles under compression.

FIG. 4 shows a plurality of fabric bag structures aligned side-by-side within a paperboard carton.

DESCRIPTION OF THE PREFERRED EMBODIMENT

Figure 5:
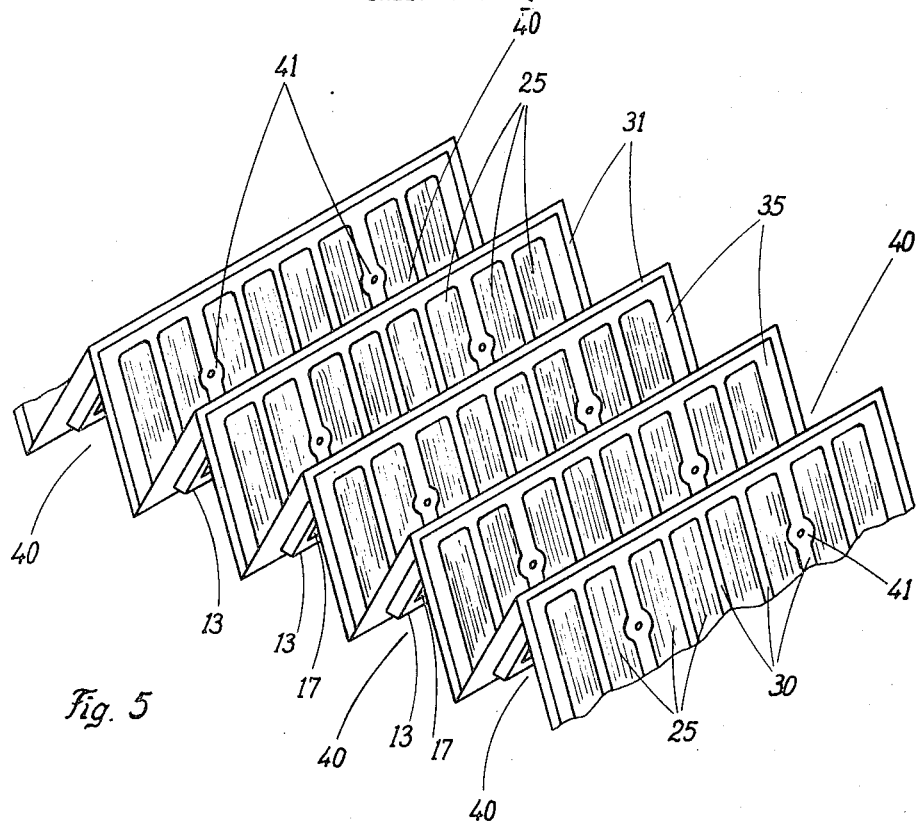
FIG. 5 shows another embodiment of the filter trays of this invention.

Referring to FIG. 1 there is shown a housing 10 containing a filter assembly 11. Each assembly is made up of a plurality of filter trays 12. Each tray includes at least one carton 13 (FIG. 2A) having sides 32, ends 33 and a bottom 34 having a flow-through orifice 14 therein. A plurality of cartons 13 may be adhesively secured to each other to form a tray 12 or a single carton 13 may be of sufficient size that it comprises the entire tray 12. Typically trays 12 are preselectively sized to fit within housing 10 in fluid tight fashion with small amounts of sealant used as necessary. One method of positioning trays 12 in housing 10 is shown in FIG. 2 wherein trays 12 are supported by L-shaped flanges 36 attached along one leg thereof to housing 10 by welding or other suitable fastening means. Trays 12 are attached to a plate means or portion 39 of housing 10 in such a manner that they form gas receiving chambers 37 and gas exhausting chambers 38. Typically, this is accomplished by interconnecting the ends of stacked trays 12 by an impervious flat sheet, as described earlier. Such an arrangement allows the disposable trays 12 to be slipped into position through gas receiving and exhausting chambers 37 and 38 as the case may be. Similarly, when the carbon filter beds are spent trays 12 may be removed through these chambers for disposal.

In the preparation of filter assembly 11 each of the cartons 13 is lined with a porous scrim material 17 and then completely filled with activated granular carbon particles 15. A second layer of porous scrim or other fluid pervious covering 25 is then laid over the carbon particles in compressive fashion and a precut facing of sheet material 35 having a flow through orifice 14 is laid thereover to form a carbon holding cavity containing the activated granular carbon particles under compression.

Alternate to using a liner 17 and covering of porous scrim material 25, it is possible to place the carbon filter material 15 in a porous scrim bag or bags 18 and insert the bag or bags in carbon 13 as shown in FIG. 4. Such bags may be generally tubular as shown in FIG. 4 or, as shown in FIG. 3, may have top and bottom portions 19 and 21 fastened at seals 20 at the front and rear edges and sides. Bags 18 can be used in place of the porous scrim liner 17 and covering 25 in carton 13, or both may be used in combination. As shown in FIG. 4 a number of smaller fabric bags 18 may be placed side-by-side in cartons 13. Use of such smaller fabric bags 18 allows the granular carbon particles to be compacted to a density which is unattainable in the larger size fabric filter bag of FIG. 3 or by placing the carbon granules directly into lined carton 13.

Figure 6:
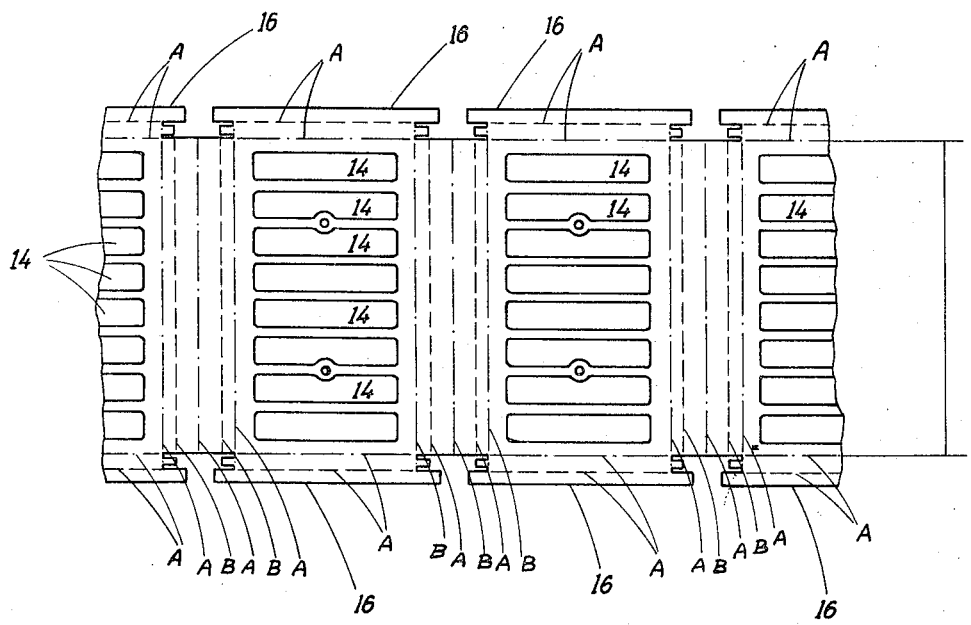
FIG. 6 shows a blank of material cut to be folded to form the tray assembly of FIG. 5.

An advantageous embodiment of the filter assembly of this invention is constructed by precutting and folding a flat sheet of impervious flexible material such as cardboard, fiberboard or polymeric resinous material to form the tray assembly shown in FIG. 5. FIG. 6 shows a blank sheet of material ready to be folded to form the filter assembly shown in FIG. 5. Foldable end portions 16 are shown preselectively cut to comprise the ends of each paperboard carton 13 when folded. Folding upwardly out of the plane of the page along the lines indicated by A in FIG. 6 and downwardly into the plane of the page along the lines indicated by B, results in open faced cartons 13 (FIG. 5). These cartons are then lined with a scrim material 17 to be further described hereinafter. Carbon granules are now metered into cartons 13 and a covering 25 of scrim material is placed thereover compressing the carbon granules into a compressed filter bed. Advantageously, the scrim covering 25 and the scrim liner 17 can be heat sealed together and simultaneously heat sealed to the flat sheet material at the sides and ends of cartons 13. A precut facing of sheet material 35 having openings identical to openings 14 of the precut sheet of FIG. 6 is placed on top of the covering 25 to complete formation of cartons 13. The filter tray assembly is now ready for insertion into a filter housing.

Under certain conditions it may not be necessary to use the covering of scrim material 25 and the cardboard support facing 35 to insure a maximum granular carbon bed density if the granular carbon filter material is placed in a porous scrim bag or bags 18 as shows in FIGS. 3 and 4. The carbon material is metered into such bags with constant vibration to insure maximum bed density. The bags are then sealed and inserted into position in open cartons 13. It then may not be necessary to cover carton 13 with a precut facing 35; but rather a thin strip of scrim material or sheet material may be placed across the open face of carton 13 to hold bags 18 in position. In the alternative, it may be advantageous to use a scrim overlay 25 to encase and hold the carbon filled bags 18 in position, or it may be advantageous to adhesively secure each of the carbon filter bags to one another and to the sidewalls of carton 13 to prevent air passage through the joints between adjacent bags.

After the activated carbon granules are placed in the cartons and the cartons made into trays and the trays into a filter arrangement, the filter arrangement is then placed in a filter housing. It should be noted that cartons 13 can be formed individually of a preselected size with one such carton forming a complete tray for the filter arrangement. In the alternative, two or more smaller cartons may be attached or adhesively secured in side-by-side arrangement to make a filter tray. It can also be seen that a filter assembly 11 can be fabricated in accordance with FIG. 5 where a multiplicity of cartons, each of which comprises a separate filter tray, are formed in continuous side-by-side relationship from a single precut sheet. Such a filter assembly provides the advantage of having the cartons 13 attached to each other thereby eliminating the need for each individual carton to be attached to an upper and lower tray at its opposite ends by an impervious end sheet 39, since portions of the precut sheet comprise fluid barriers which define in combination with each separate filter tray 12 air accumulation chambers 40 on the upstream and downstream sides thereof.

The porous scrim bags 18 of this invention can be made from any suitable fluid-pervious material. Such materials can be either woven or non-woven as long as they have pores sufficiently small to prevent passage of the carbon filter granules therethrough. Advantageously, a suitable polymeric resinous material is used such as polyethylene, polypropylene, polystyrene, polybutadiene or the copolymers of any of the above. Advantageously, the scrim material of the bags is heat sealable but it is not necessary that such be the case. The scrim bags shown in FIG. 4 are preferably formed from a single sheet of material and are generally tubular in shape having a longitudinally extending seam or heat seal and closed ends. It should be noted that the scrim used to make the filter bags is equally acceptable for the liner 17 and the porous scrim material covering 25 of the cartons 13.

Figure 7:
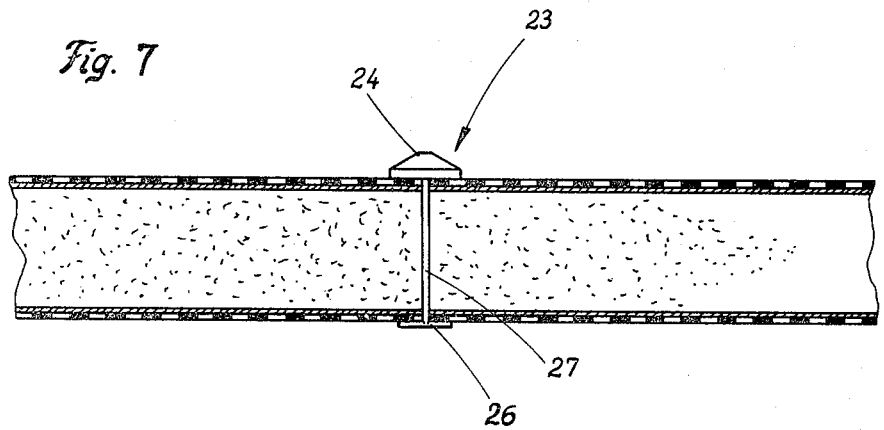
FIG. 7 shows a fabric bag structure including a fastening means for maintaining a constant fabric bag thickness.

To insure that a uniform bed thickness is maintained throughout the filter assembly, it is desirable to restrict the porous scrim bags 18 or cartons 13 to a specific preselected thickness using fastening means 23 (FIG. 7). Fastening means 23 is comprised of a head 24 and cross bar 26 and a shaft 27 connecting the two. It is generally of plastic construction but need not be so restricted. Its insertion through the bag or paperboard carton is accomplished by simply positioning cross bar 24 longitudinally with respect to the proposed direction of penetration of the shaft and injecting it through the scrim filter bag or carton, and then repositioning cross bar 24 crosswise into holding position on the opposite side thereof. It should be noted that islands 41 may be provided in opposed panels of the filter assembly of FIG. 5 to provide support for fastening means 23 in maintaining trays 12 uniform in thickness. When inserted through a filter bag or carton, or both, fastening means 23 is found to be an effective method of maintaining compressive forces on the carbon particles contained therein.

Figure 8:
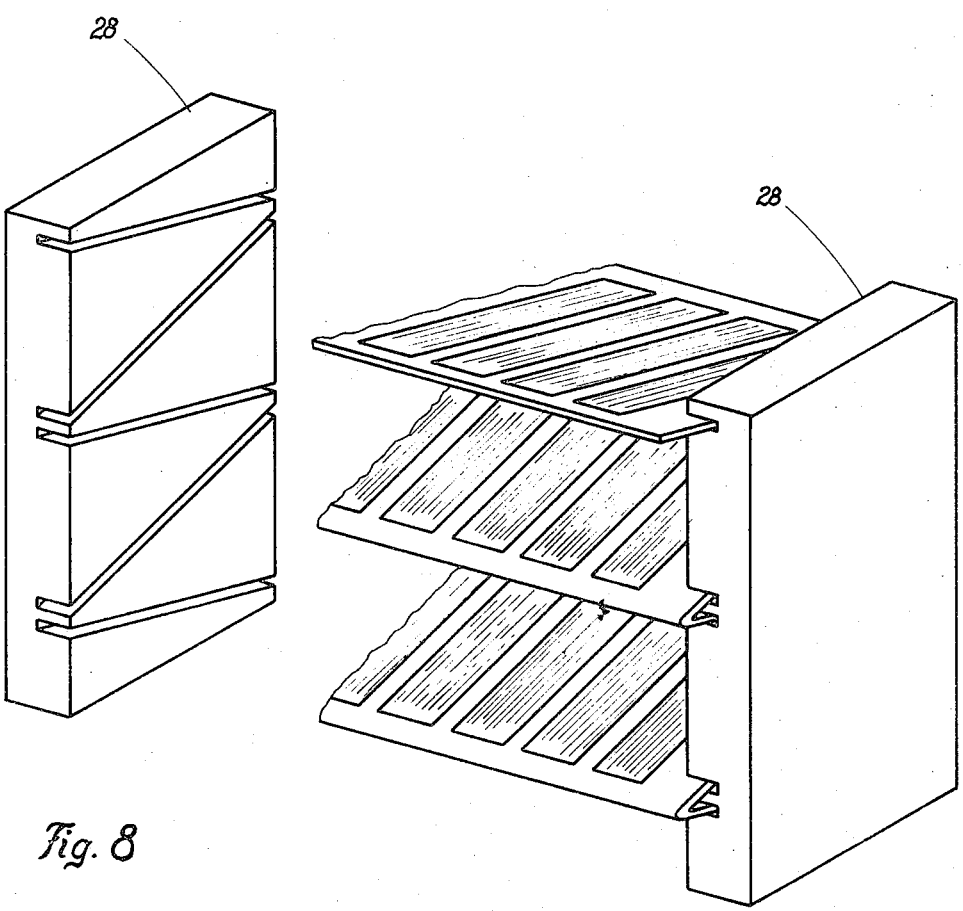
FIG. 8 shows a receiving means for the filter assembly of FIG. 5.

In FIG. 8 is shown a set of opposed end pieces 28 which may be inserted within housing 10 to receive and position filter assembly 11. Opposed end pieces 28 are advantageously foam moldings and may advantageously be fabricated from foamed polymeric resinous materials such as polystyrene, polyethylene, polypropylene, polybutadiene or copolymers of any of the above. Also, opposed end pieces 28 have grooves 29 therein which can be preselectively sized to receive, in fluid tight relationship, the edges of disposable paperboard cartons 13 to secure said cartons in a preselected geometric configuration.

Having thus described the invention what is claimed is:

1. A carbon filter comprising: at least one six-sided carton including a pair of opposed panels each having cutaway sections defining flow-through apertures therein;
   sidewalls connecting said panels;
   end portions forming closed ends on said carton;
   a fluid pervious scrim material disposed within said carton across said flow-through apertures compressively containing activated granular carbon particles to form a filter bed resistant to the adverse effects of vibration and carbon particle attrition.

2. The filter of claim 1 wherein said fluid pervious scrim material covers said flow-through apertures in said panels and lines the interior of said six-sided carton to form a carbon holding cavity for compressively containing activated granular carbon particles.

3. The filter of claim 2 wherein said six-sided carton includes fastening means penetrating therethrough and supporting opposite sides thereof to provide a substantially uniform bed thickness throughout said six-sided carton.

4. The filter of claim 1 wherein said fluid pervious scrim material is formed into at least one fluid pervious filter bag compressively containing activated granular carbon particles and disposed in said carton across said flow-through apertures to form a carbon bed through which gases to be treated entering said carton must pass before leaving said carton.

5. The filter of claim 3 wherein said filter bag includes fastening means penetrating therethrough and supporting opposite sides thereof to provide a substantially uniform bed thickness throughout said bag.

6. The filter of claim 4 wherein a plurality of filter bags containing activated granular carbon particles are disposed in said six-sided carton in side-by-side relationship covering said flow-through apertures in said opposed panels and wherein said filter bags are adhesively secured to each other and to said panels to provide a uniform bed of granular carbon particles.

* * * * *